United States Patent
Chiussi et al.

(10) Patent No.: US 7,031,255 B2
(45) Date of Patent: Apr. 18, 2006

(54) METHOD AND APPARATUS FOR GUARANTEEING DATA TRANSFER RATES AND DELAYS IN DATA PACKET NETWORKS USING GENERALIZED DISCRETE DATA TRANSFER RATE APPROACH

(75) Inventors: Fabio Massimo Chiussi, Tinton Falls, NJ (US); Andrea Francini, Eatontown, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/748,378

(22) Filed: Dec. 30, 2003

(65) Prior Publication Data

US 2004/0151167 A1   Aug. 5, 2004

Related U.S. Application Data

(63) Continuation of application No. 09/247,779, filed on Feb. 9, 1999, now Pat. No. 6,693,913.

(51) Int. Cl.
*H04J 1/16* (2006.01)
*H04J 12/28* (2006.01)
(52) U.S. Cl. .................. 370/230; 370/235; 370/412
(58) Field of Classification Search ........ 370/230–235, 370/397, 395.2, 412–420, 468
See application file for complete search history.

(56) References Cited

U.S. PATENT DOCUMENTS

| 6,144,637 | A  | * | 11/2000 | Calvignac et al. | .......... 370/229 |
| 6,408,005 | B1 | * | 6/2002  | Fan et al.       | .................... 370/412 |
| 6,438,134 | B1 | * | 8/2002  | Chow et al.      | ................ 370/412 |
| 6,477,144 | B1 | * | 11/2002 | Morris et al.    | ............ 370/230.1 |

* cited by examiner

*Primary Examiner*—Dang Ton
*Assistant Examiner*—Melanie Jagannathan

(57) ABSTRACT

A scheduler and method for use in packet communication systems apply a generalized discrete-rate scheduling technique which removes the limitation of the linear increase in sorting complexity with the number of supported service rates. The set of supported service rates may be increased without increasing the number of timestamps that need to be sorted. Conversely, the generalized discrete-rate scheduler supports a given number of service rates using a smaller number of rate FIFO queues, thus further reducing complexity. Such improved performance is achieved by splitting, for scheduling purposes only, a connection or session into multiple sub-connections or sub-sessions. The technique can be applied to per-connection-timestamp and no-per-connection-timestamp discrete-rate schedulers, as well as to any other discrete-rate scheduler.

7 Claims, 6 Drawing Sheets

METHOD AND APPARATUS FOR GUARANTEEING DATA TRANSFER RATES AND DELAYS IN DATA PACKET NETWORKS USING GENERALIZED DISCRETE DATA TRANSFER RATE APPROACH

CROSS-REFERENCE TO RELATED APPLICATIONS

This application is a continuation of Ser. No. 09/247/779 filed on Feb. 9, 1999 now U.S. Pat. No. 6,693,913.

This application is related to co-pending U.S. patent application No. 60/079,647, filed Mar. 27, 1998, and entitled METHOD AND APPARATUS FOR GUARANTEEING DATA TRANSFER RATES AND DELAYS IN DATA PACKET NETWORKS USING GENERALIZED DISCRETE DATA TRANSFER RATE APPROACH.

This application is also related to a commonly assigned and co-pending U.S. patent application Ser. No. 09/247,742 of Fabio Chiussi and Andrea Francini, entitled METHOD AND APPARATUS FOR GUARANTEEING DATA TRANSFER RATES AND DELAYS IN DATA PACKET NETWORKS USING DISCRETE DATA TRANSFER RATES, filed Feb. 9, 1999.

BACKGROUND OF THE INVENTION

The present invention relates to packet communication systems, and in particular to a method and an apparatus for scheduling packets in packet networks for guaranteeing data transfer rates to data sources and data transfer delays from data sources to destinations using a discrete data transfer rate scheduler in which the number of queues serving the data connections is less than the number of discrete data transfer rates supported by the scheduler. This invention can be used in any system for data packet forwarding such as Asynchronous Transfer Mode (ATM) switches and Internet Protocol (IP) routers.

Per-Virtual-Connection (Per-VC) schedulers are known which aim to approximate a Generalized Processor Sharing policy, as described in A. K. Parekh and R. G. Gallager, "A Generalized Processor Sharing Approach to Flow Control in Integrated Services Networks: The Single-Node Case", IEEE/ACM TRANSACTIONS ON NETWORKING, June 1993, pp. 344–357, which is incorporated herein by reference. As defined herein, the term "VC" is used throughout to mean "virtual connection". It is understood that virtual connections may also include virtual circuits and Internet Protocol (IP) flows. Implementation of such Per-VC schedulers is a central issue in next-generation switching systems. In a market arena in which cost targets are precipitously dropping, an important objective is to minimize the complexity involved in Per-VC schedulers, and to minimize the cost differential with respect to switches using less sophisticated scheduling.

As defined herein and throughout, the term "GPS" is an abbreviation for the Generalized Processor Sharing policy, as described in A. K. Parekh et al., supra. GPS-related packet-scheduling disciplines are based on maintaining a global function, referred to by different authors either as a virtual time, such as in A. K. Parekh et al., supra, and in S. J. Golestani, "A Self-Clocked Fair Queuing Scheme for Broadband Applications", PROCEEDINGS OF INFOCOM '94, April 1994, pp. 636–646, which is incorporated herein by reference; or as a system potential, such as described in D. Stiliadis and A. Varma, "Design and Analysis of Frame-based Fair Queuing: A New Traffic Scheduling Algorithm for Packet-Switched Networks", PROCEEDINGS OF SIG-METRICS '96, May 1996, pp. 104–115; and D. Stiliadis and A. Varma, "Efficient Fair Queuing Algorithms for ATM and Packet Networks", TECHNICAL REPORT UCSC-CRL-95-59, December 1995, with each of these references being incorporated herein by reference.

The global function tracks the amount of work that is done by the server to process packets in the communication system. The server uses this global function to compute, for each packet in the system, a timestamp that specifies when the packet should be transmitted relative to other packets. Packets are transmitted by increasing order of their timestamps. The specific function used as system potential determines the delay and fairness properties of each algorithm in the class.

The total implementation cost of these GPS-related scheduling algorithms is the combination of three factors: (i) the complexity of the function used as system potential to compute the timestamps for the packets in the system, (ii) the complexity involved in sorting the timestamps in order to select the packet with a minimum timestamp for transmission, and (iii) the cost of handling and storing the timestamps. In recent years, several scheduling algorithms which use a system-potential function of order $O(1)$ complexity have been introduced. Examples of such algorithms include Self-Clocked Fair Queuing (SCFQ), as described in S. J. Golestani, supra; Frame-based Fair Queuing (FFQ), as described in D. Stiliadis et al., "Design and Analysis of Frame-based Fair Queuing . . . ", supra; Virtual Clock, as described in L. Zhang, "Virtual Clock: A New Traffic Control Algorithm for Packet Switching", ACM TRANSACTIONS ON COMPUTER SYSTEMS, May 1991, pp. 101–124; and Minimum-Delay Self-Clocked Fair Queuing (MD-SCFQ), described in F. M. Chiussi and A. Francini, "Minimum-Delay Self-Clocked Fair Queuing Algorithm for Packet-Switched Networks", PROCEEDINGS OF INFO-COM '98, March 1998, each of which is incorporated herein by reference.

In particular, among these algorithms, MD-SCFQ has both optimal delay properties and excellent fairness properties. Scheduling algorithms achieving a desired performance with a system-potential function of minimal complexity are therefore available, but the total performance cost of the scheduler is still dominated by the complexity of sorting and storing the timestamps.

One well-known simplification in timestamp processing by a scheduler is obtained by assigning increasing values of timestamps to consecutive packets which belong to the same session, so that for each session only the timestamp of the packet at the head of the corresponding packet queue is to be considered and processed in the packet selection process. Such a timestamp is referred to as session timestamp. The number of session timestamps which have to be sorted is therefore equal to the number of sessions V supported by the scheduler. For example, typical values of V in current ATM switches, in which sessions are referred to as VCs, are in the order of tens of thousands of sessions. The range of possible values that the timestamps can assume at any given time depends on the ratio between the maximum and minimum service rates that the scheduler is required to provide to the connections. Such a timestamp range is typically very wide.

In view of the complexity in sorting a large number of timestamps over a wide range of possible values at the high speeds employed in broadband digital networks, hardware implementations of packet switching systems are only affordable by data structures and processor configurations that are specifically devised to be efficiently mapped into silicon on integrated circuits or chips. Even with such specialized structures, the implementation cost may still be too high, and techniques to further reduce complexity are necessary. Different approaches are possible for this purpose. In some cases, the specific properties of a scheduler can help in simplifying the selection process.

Several techniques have been proposed to reduce the cost of the sorting operation. In particular, two approaches are the Logarithmic Calendar Queue (LCQ) introduced in F. M. Chiussi, A. Francini and J. G. Kneuer, "Implementing Fair Queuing in ATM Switches—Part 2: The Logarithmic Calendar Queue", PROCEEDINGS OF GLOBECOM '97, November 1997, pp. 519–525; as well as the discrete-rate scheduler presented in J. C. R. Bennett, D. C. Stephens and H. Zhang, "High Speed, Scalable, and Accurate Implementation of Fair Queuing Algorithms in ATM Networks", PROCEEDINGS OF ICNP '97, October 1997, pp. 7–14, each of which are incorporated herein by reference. Both of these approaches are arguably the two approaches that achieve the highest reduction in the hardware complexity of a GPS-related scheduler with optimal delay properties. In addition, such approaches introduce only a very small degradation in the delay bounds of the scheduler.

The LCQ is an optimized calendar queue which reduces the complexity by increasing, in an optimal manner, the granularity of the bins used to sort the timestamps, so that the relative degradation in delay bounds for each connection is equalized.

The discrete-rate scheduler is a relatively simple structure that can be used when the guaranteed service rates that the scheduler needs to support at any given time only belong to a relatively small set of discrete values. Such operating conditions are certainly realistic in most, if not all, ATM switches. As shown in FIG. 1, the illustrated discrete-rate scheduler 10 is a per-connection-timestamp scheduler having a corresponding timestamp for each of the sessions; for example, the sessions 14–16 in FIG. 1. Each of the sessions 14–16 has a corresponding session controller 71–73 and a corresponding timestamp 22–24, respectively.

Other advantages are known for using a discrete set of rates. In this case, connections with the same service rate are grouped together in common rate First-In-First-Out (FIFO) queues, and scheduling is performed only among the connections at the head of each rate FIFO queue. Accordingly, the per-connection timestamp scheduler 10 in FIG. 1 has the plurality of registers for storing pointers as heads 12 and tails 18 for maintaining the number N of rate FIFO queues 28, with the sessions 14–16 in a given queue having the same rate from among rates $r_1 \ldots r_N$.

Thus, the registers 12 and 18 in Rate FIFO Queue 1 are associated with a common rate $r_1$, with a first head 12 labeled HEAD(1) as a head pointer pointing to sessions in the queue and having an associated timestamp 20 labeled $F_{HEAD(1)}$; a first set of sessions 14–16 having session controllers 71–73 labeled $SC_{1,A}$ and $SC_{1,B}$, respectively, and timestamps 22–24 labeled $F_{1,A}$ and $F_{1,B}$, respectively; and a first tail TAIL(1) 18 as a tail pointer to sessions in the queue and having an associated timestamp 26 labeled $F_{TAIL(1)}$. As described above, scheduling is performed by processing the sessions pointed to at the heads of the queues, with such sessions being processed by a Smallest-Eligible-Finishing-potential-First (SEFF) selector 30 to determine a minimum eligible timestamp for service from among the sessions pointed to by the heads of the queues 28.

The implemented scheduler may have certain properties for the maximum distance between timestamps of different connections having the same rate, and for the relation between system potential and timestamps, as is the case for the worst-case-fair weighted fair queuing system ($WF^2Q$, or alternatively $WF^2Q+$) described in J. C. R. Bennett and H. Zhang, "Hierarchical Packet Fair Queuing Algorithms", PROCEEDINGS OF SIGCOMM '96, August 1996, pp. 143–156; and other worst-case-fair schedulers, such as described in D. Stiliadis and A. Varma, "A General Methodology for Designing Efficient Traffic Scheduling and Shaping Algorithms", PROCEEDINGS OF INFOCOM '97, April 1997, with each of these articles being incorporated herein by reference.

The number of timestamps to be sorted is greatly reduced, for example, to be equal to the number of supported rates, and therefore the complexity of the sorting task is considerably decreased.

Other possible scheduling techniques may be implemented. For example, in the no-per-connection-timestamp scheduler 32 of FIG. 2, the sessions are maintained in queues 38 to be selectively serviced by a SEFF selector 54. Each of the rate FIFO queues 38 is treated as a single macro-session, such that the queues 38 form a set of macro-sessions 56–60. Accordingly, for a given rate FIFO queue such as the queue having the timestamp 42 and the head 48, the macro-session 56 has the head 48 and tail 62 and includes the queued sessions 64–66, having associated session controllers 73–75, with the timestamp 42 being associated with the entire queue and the entire macro-session 56.

A limitation of existing discrete-rate schedulers is that the associated complexity increases linearly with the number of rates, and therefore this approach is attractive only for relatively small numbers of rates, such as 32 or 64 rates, which may be excessively restrictive to the performance of the scheduler. In fact, in order to take advantage of the reduced number of elements to be sorted, sorting is to be performed by linear search, which further restricts the performance of the scheduler.

SUMMARY

It is an object of the present invention to provide a technique to perform as a generalized discrete-rate scheduler to remove the limitation of existing discrete-rate schedulers due to the linear increase in sorting complexity with the number of rates, and to further reduce the implementation cost of such a scheduler. Using such a generalized discrete-rate scheduler, a given number of rate FIFO queues is able to support a larger number of guaranteed rates. Each rate FIFO queue accommodates connections with a certain basic guaranteed service rate, as well as connections with guaranteed service rates that are multiples of the associated basic rate. Connections having a service rate which does not correspond to a basic rate are split into sub-sessions or sub-connections of equal rate, with such splitting performed for scheduling purpose only. Accordingly, the splitting does not affect the connections in any way except to improve the processing of the connections.

With this method, the set of supported service rates may be increased without increasing the number of timestamps to be sorted. Conversely, for a given number of service rates that have to be supported, the associated processing complexity is reduced by using a smaller number of rate FIFO queues. The effects on the delay bounds is minimal, and is only experienced by those connections having rates that are not basic rates. The technique can be applied to per-connection timestamp and no-per-connection-timestamp schedulers, as well as to any discrete-rate scheduler.

The present invention relates to a method and an apparatus for scheduling packets in packet networks for guaranteeing data transfer rates to data sources and data transfer delays from data sources to destinations using a discrete data transfer rate scheduler where the number of queues serving the data connections is lower than the number of discrete data transfer rates supported by the scheduler.

DETAILED DESCRIPTION OF THE PREFERRED EMBODIMENT

Referring now to FIGS. 3–6, the present invention relates to a method and apparatus implementing a technique for removing the limitation of a discrete-rate scheduler due to the linear increase in sorting complexity with the number of rates and further reduce the implementation cost of such a scheduler. In the illustrative embodiments, the present invention is applied to reduce the implementation complexity for a GPS-related scheduler in an ATM network, but it is to be understood that the present invention can be applied to reduce the implementation complexity for any GPS-related scheduler in any packet network.

The present invention is a Generalized-Discrete-Rate scheduler and method of use which does not have the limitation of existing discrete-rate schedulers due to the linear increase in complexity of the sorting structure with the number of rates. Thus, the Generalized-Discrete-Rate scheduler and method is not limited to a relatively small number of rates, of the order of 32 or 64, as are existing discrete-rate schedulers.

The present invention permits the support of a number of guaranteed service rates which is larger than the number of rate FIFO queues at the cost of a small degradation in terms of delay guarantees. Conversely, given a desired number of rates to be supported, a smaller number of rate FIFO queues can be used. The present invention can be used with any discrete-rate scheduler, including existing discrete-rate schedulers with per-connection timestamps, such as the scheduler described above and schematically shown in FIG. 1, as well as the no-per-connection-timestamp discrete-rate scheduler, schematically shown in FIG. 2 and described in greater detail in a commonly assigned U.S. patent application of Fabio Chiussi and Andrea Francini, entitled METHOD AND APPARATUS FOR GUARANTEEING DATA TRANSFER RATES AND DELAYS IN DATA PACKET NETWORKS USING DISCRETE DATA TRANSFER RATES, filed Feb. 9, 1999, which is incorporated herein by reference.

Figure 1:
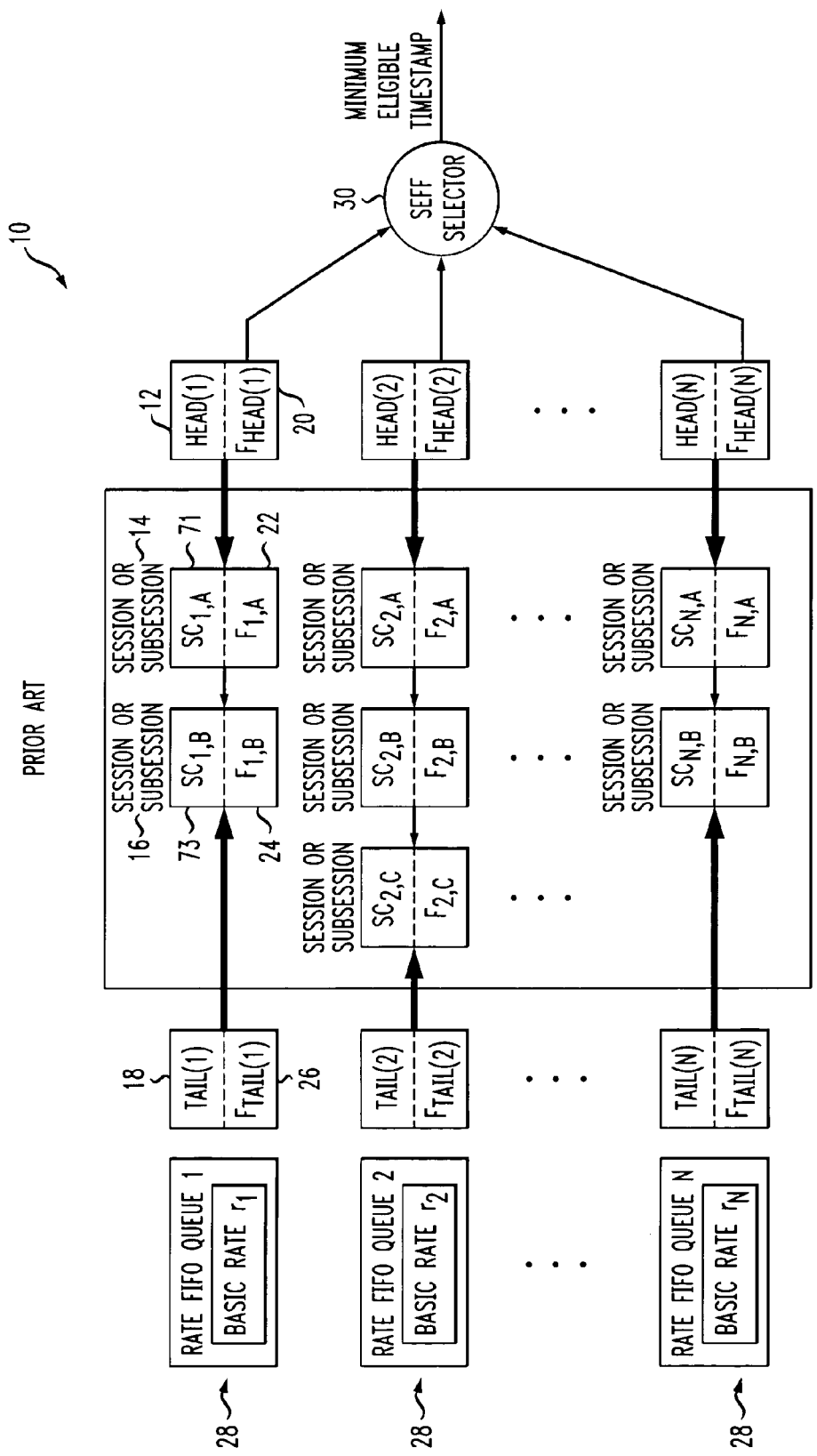
FIG. 1 illustrates a per-connection-timestamp discrete-rate scheduler.
Figure 2:
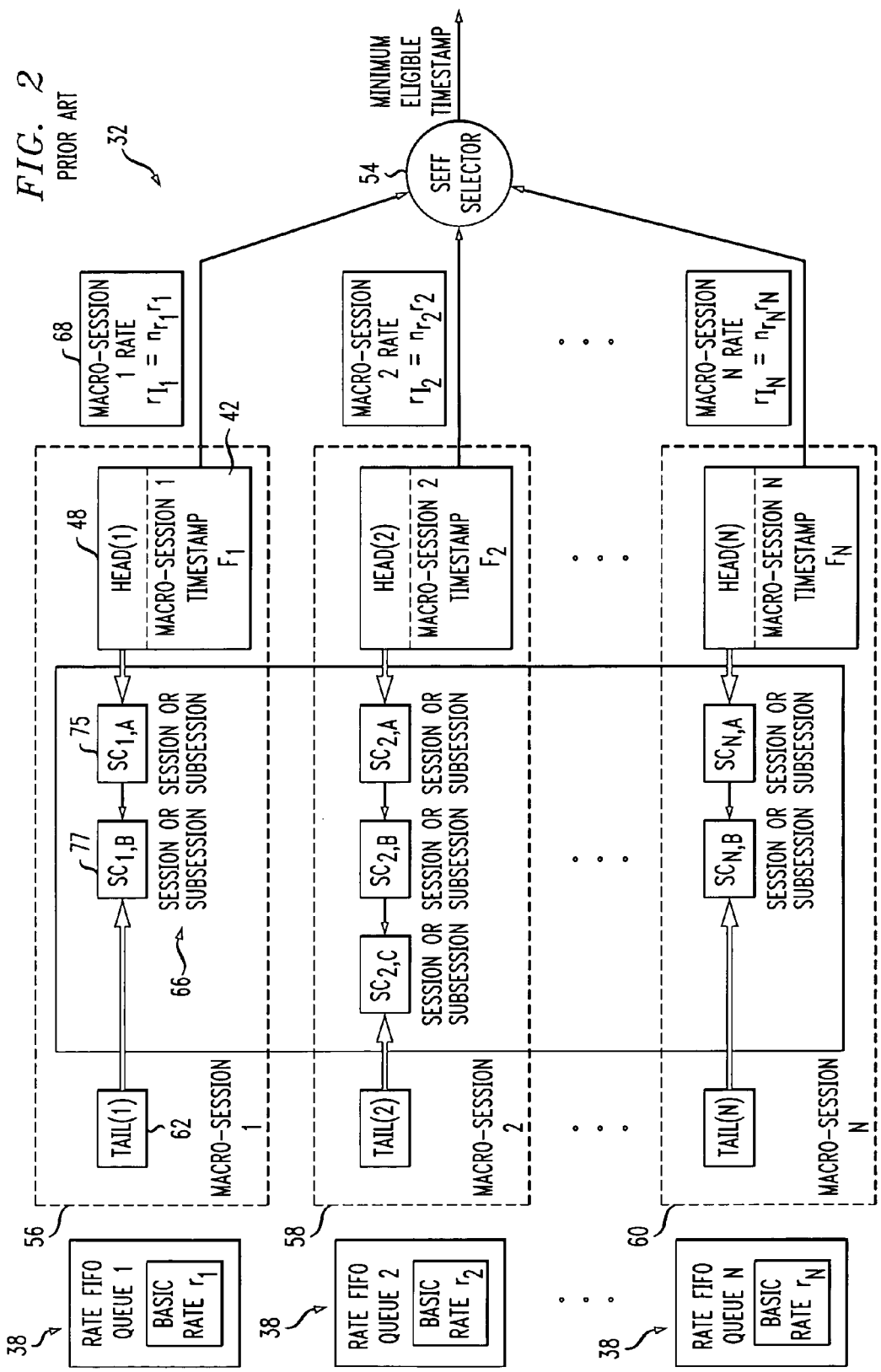
FIG. 2 illustrates a no-per-connection-timestamp discrete-rate scheduler.
Figure 5:
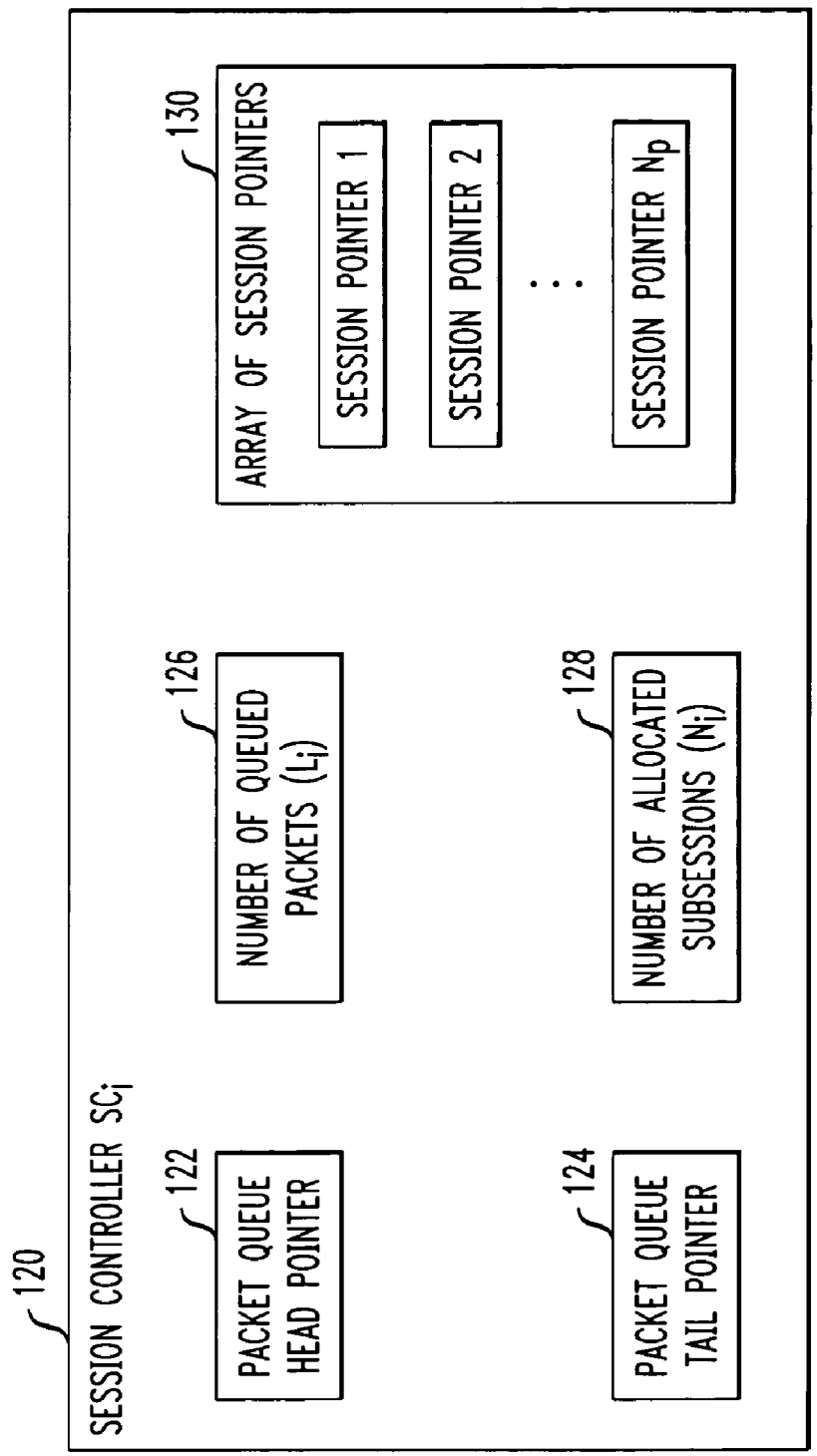
FIG. 5 illustrates a session controller.

The Generalized-Discrete-Rate scheduler and method of the present invention is implemented in the session controllers 120 of FIG. 5, associated with the sessions 14–16 of FIG. 1 and with the sessions 64–66 of FIG. 2, to control the processing of sessions into the rate FIFO queues 28, 38, respectively.

Figure 3:
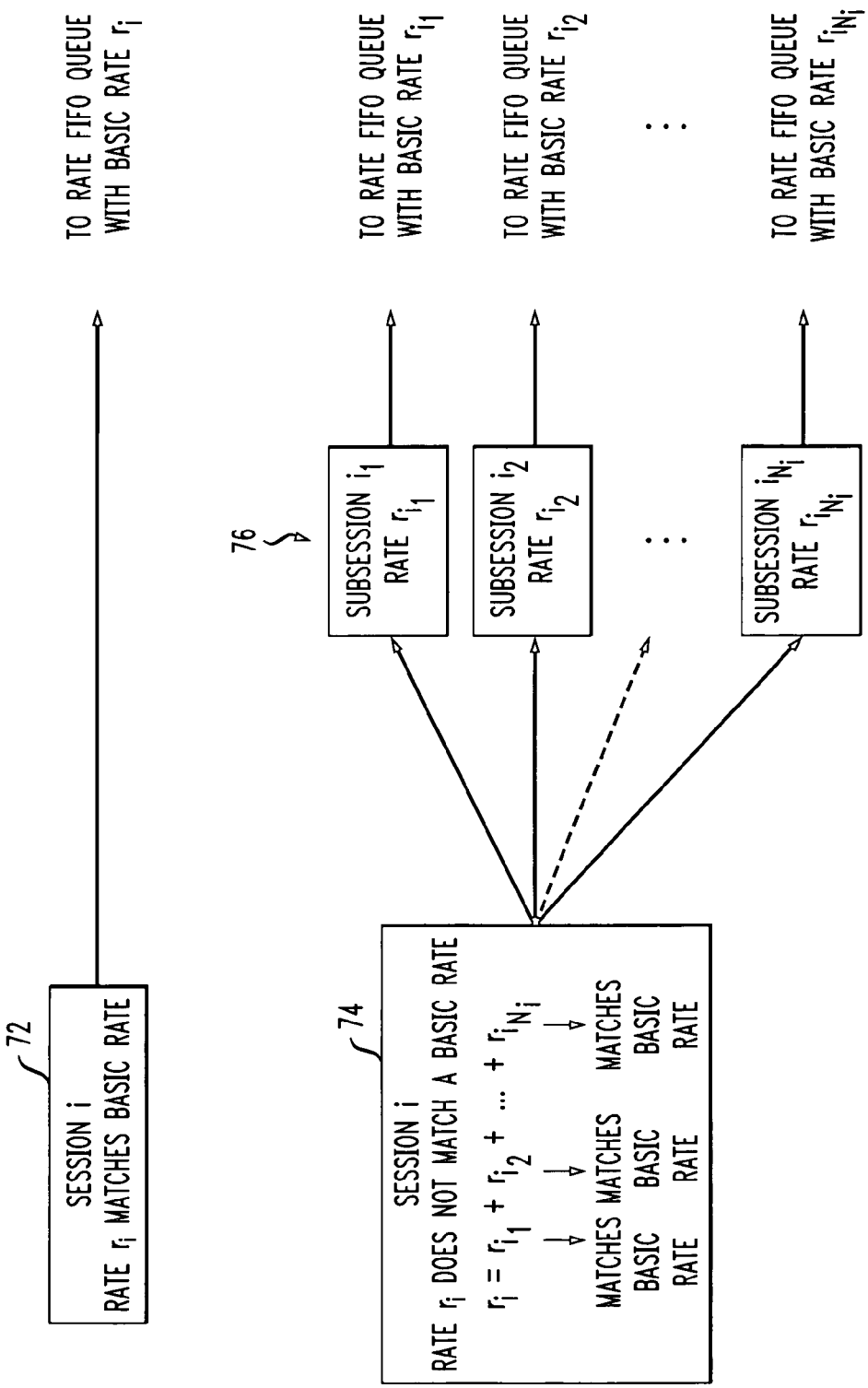
FIG. 3 illustrates a schema for assigning sessions and sub-sessions to rate FIFO queues.

Referring to the present invention shown in FIGS. 3–6, $N_r$ service rates are supported, while the implementation is based on $N_g$ rate FIFO queues, with $N_g < N_r$. Each rate FIFO queue is associated with a basic service rate from among the $N_g$ basic service rates. Referring to FIG. 3, a session i as in box 72, having a service rate $R_i$ matching one of the basic service rates, is queued in the corresponding rate FIFO queue with the basic rate $r_i$, and treated accordingly by the discrete-rate scheduler, such as either of the schedulers shown in FIGS. 1–2. However, a session i as in box 74, having a service rate $r_i$ which does not directly match any of the basic rates, is split into $N_i$ sub-sessions $i_j$, as sub-sessions 76 in FIG. 3, of equal rate $r_{i_j} = r_i/N_i$, with $1 \leq j \leq N_i$ and $N_i \leq N_p$, in which the rate $r_{i_j}$ of the sub-sessions 76 matches a basic rate and $N_p$ is the number of session pointers that are available in each of the session controllers 120 illustrated in FIG. 5.

The sub-session rates $r_{i_1}, r_{i_2}, \ldots r_{i_{N_i}}$, are equal; that is:

$$r_{i_1} = r_{i_2} = r_{i_{N_i}} = \frac{r_i}{N_i} \qquad (2)$$

and so, as shown in FIG. 3:

$$r_i = r_{i_1} + r_{i_2} + \ldots + r_{i_{N_i}} \qquad (3)$$

Figure 4:
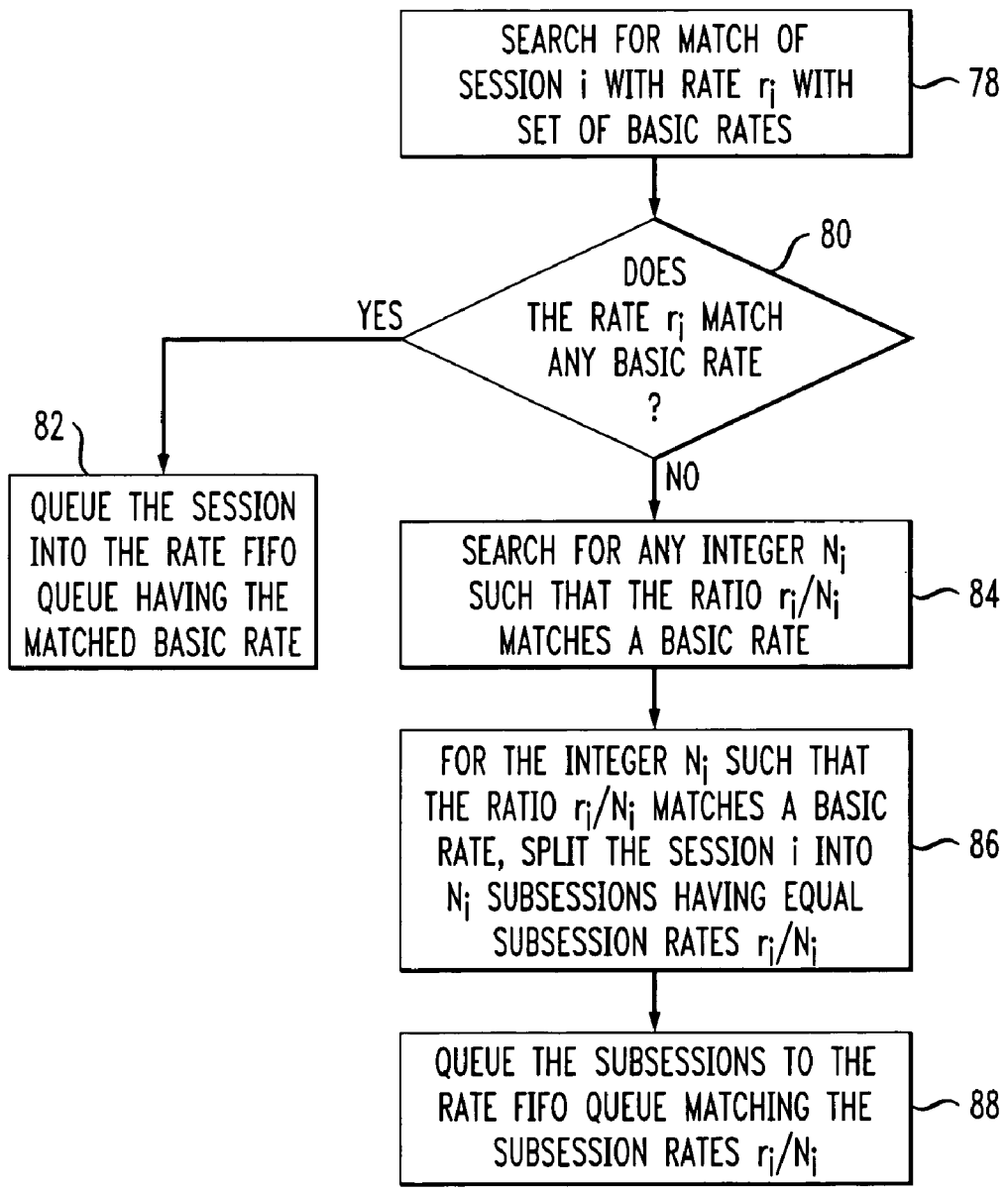
FIG. 4 illustrates a method implementing the schema of FIG. 3.

The sub-sessions 76 are then associated with the rate FIFO queue having the basic rate $r_{i_{N_1}}$. As shown in FIG. 4, the set-up procedure for a newly established session i includes the steps of: searching in step 78 for a match of session i having rate $r_i$ with the set of basic rates, and determining in step 80 whether the rate $r_i$ matches any basic rate. If there is a match in step 80, then the method associates the session in step 82 with the rate FIFO queue having the matched basic rate, so that the session is serviced by the schedulers in FIGS. 1–2 as in the known manner.

Otherwise, if there is no detected match in step 80 to any basic rate, then the method searches in step 84 for an integer number $N_i \leq N_p$ such that $r_i/N_i$ is one of the $N_g$ basic service rates. For that matched rate, the method splits the session i into $N_i$ sub-sessions having equal sub-session rates $r_i/N_i$ in step 86, and then associates the sub-sessions with the rate FIFO queue having the matching basic rate $r_i/N_i$ in step 88.

There are some constraints on $N_r$, the number of service rates that can belong to the complete set of supported service rates, since $N_r - N_g$ rates have to be multiples of other rates. However, with 32 or 64 basic rates, the freedom in the possible combinations of rates that can be supported is quite large.

Referring to FIG. 5, a session controller 120 associated with a session i includes: a pointer 122 to the head of the packet queue of session i; a pointer 124 to the tail of the packet queue for session i; a register 128 with the number of sub-sessions configured for session i; and an array 130 of $N_p$ session pointers used to queue the sub-sessions of session i into the corresponding rate FIFO queue ($N_p \geq N_i$).

At most $N_i$ entries corresponding to the sub-sessions of session i can be in the rate FIFO queue of basic rate $r_i/N_i$ at any time. The proper number of entries in the rate FIFO queue is managed by the session controller 120 with respect to the length $L_i$ of the queue of packets corresponding to session i as described below with reference to FIG. 6.

Figure 6:
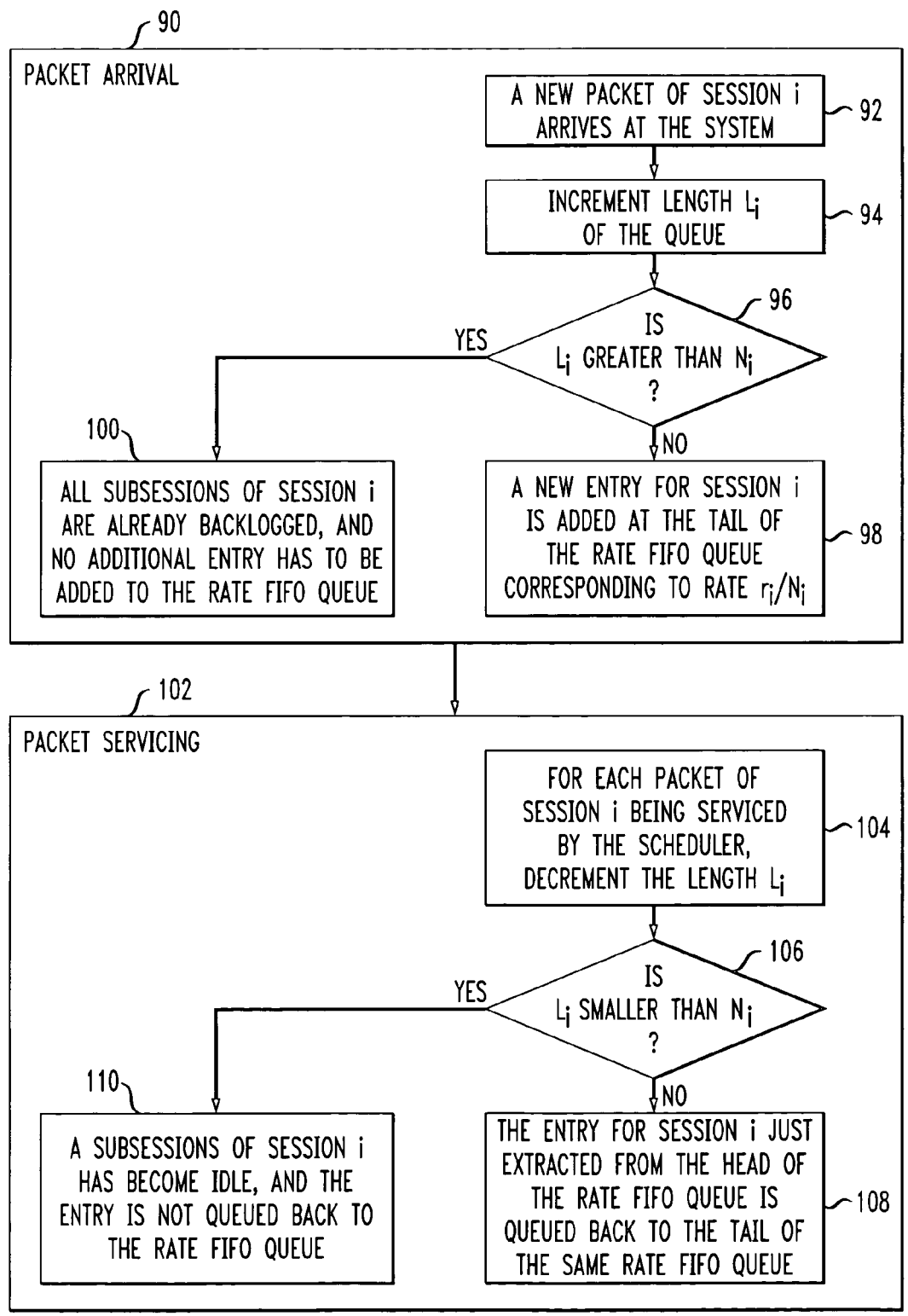
FIG. 6 illustrates a method for processing sessions at packet arrivals and departures.

As shown in FIG. 6, with reference to packet arrival in step 90, every time a new packet of session i arrives at the system in step 92, the length $L_i$ of counter 126 is incremented in step 94. Then, if $L_i$ is not greater than $N_i$, as determined in step 96, a new entry for session i is added at the tail of the rate FIFO queue corresponding to rate $r_i/N_i$ in step 98, and the $L_i$-th session pointer in the session-pointer array 130 is used to link the entry of session i to the next session eventually appended to the tail of the same rate FIFO queue. Otherwise, all sub-sessions of session i are classified as already backlogged in step 100, and no additional entry has to be added to the rate FIFO queue.

Every time a packet of session i is serviced by the scheduler in step 102, the content $L_i$ of the counter 126 is decremented in step 104. Then, if $L_i$ is not smaller than the content $N_i$ of the register 128, as determined in step 106, the entry for session i just extracted from the head of the rate FIFO queue is queued back, in step 108, to the tail of the same rate FIFO queue. Otherwise, a sub-session of session i is classified as idle in step 110, and the entry is not queued back to the rate FIFO queue.

After packet arrival in step 90, packet servicing is performed in step 102, so that every time a packet of session i is serviced by the scheduler the length $L_i$ is decremented in step 104. Then, if $L_i$ is not smaller than $N_i$, as determined in step 106, the entry for session i just extracted from the head of the rate FIFO queue is queued back, in step 108, to the tail of the same rate FIFO queue. Otherwise, a sub-session of session i has become idle in step 110, and the extracted entry is not queued back to the rate FIFO queue.

The session i is split in multiple sub-sessions for scheduling purpose only, and so the processing and servicing of session i is not affected in any other way. One difference compared to the case in which sessions are not split is that more than one entry in the corresponding rate FIFO queue may be pointing at session i. Such session management operates particularly well in the case of the no-per-connection-timestamp scheduler shown in FIG. 2, because there is no need to maintain a timestamp for each sub-session. In the case of the discrete-rate scheduler with per-connection timestamps shown in FIG. 1, a timestamp for each sub-session is required to be maintained.

The following delay bound $D_i^{nts}(N_i)$, in which "nts" stands for "no timestamp", holds for a $(b_i, r_i)$-leaky-bucket-constrained session i that is split in $N_i$ sub-sessions with service rate $r_i/N_i$ in the no-per-connection-timestamp scheduler:

$$D_i^{nts}(N_i) < \frac{b_i+1}{r_i} + \frac{5N_i}{4r_i} \quad (1)$$

in which $b_i$ is a bucket size in a $(b_i, r_i)$-leaky-bucket-constrained session i.

Also, the following delay bound $D_i^{wts}(N_i)$, in which "wts" stands for "with timestamp", holds for the same session in the discrete-rate scheduler with per-connection timestamps:

$$D_i^{wts}(N_i) < \frac{b_i+1}{r_i} + \frac{2N_i}{r_i} \quad (2)$$

Comparing these delay bounds with the respective bounds in each scheduler when session i is not split, the only effect of dividing session i into $N_i$ sub-sessions is the increment of its worst-case delay by no more than $$\frac{5N_i}{4r_i}$$

in the case of the no-per-connection-timestamp scheduler in FIG. 2, and by no more than $2N_i/r_i$ in the case of the discrete-rate scheduler with per-connection timestamps in FIG. 1. This degradation is a consequence of the increase in latency that is experienced by the sub-sessions due to their reduced service rate.

By the foregoing a novel and unobvious scheduler and method has been disclosed by way of the preferred embodiment. However, numerous modifications and substitutions may be had without departing from the spirit of the invention. For example, while the preferred embodiment discusses an ATM scheduler, it is wholly within the purview of the invention to contemplate applying the session splitting and sub-session processing in the manner as set forth above to other packet network systems. Accordingly, the invention has been described by way of illustration rather than limitation.

What is claimed is:

1. A method for processing a session in a packet-processing system the session having a service rate, the method comprising the steps of:
    determining whether the service rate matches one of a plurality of basic rates $R_i$, with each basic rate associated with a respective one of a plurality of rate-specific queues; and
    splitting the session, in response to a non-match of the service rate with any one of the plurality of basic rates, into a plurality of N subsessions for queuing into one of the plurality of rate-specific queues, where a subsession rate is selected and the session is split into the plurality of N subsessions such that every subsession is restricted to have an identical subsession rate $r_{i,j}$ satisfied by dividing the service rate by N to equal one of the plurality of basic rates $R_i$.

2. The method of claim 1, wherein the subsession rate matches one of the plurality of basic rates.

3. The method of claim 1, further comprising the step of:
    queuing the subsessions into a corresponding rate-specific queue having an associated basic rate matching the subsession rate.

4. The method of claim 1, wherein the steps of determining and splitting are performed by a queue controller.

5. The method of claim 1, further comprising the step of:
    processing the session and subsessions using a per-connection-timestamp procedure.

6. The method of claim 1, further comprising the step of:
    processing the session and subsessions using a no-per-connection-timestamp procedure.

7. The method of claim 1, wherein the rate-specific queues are rate first-in-first-out (FIFO) queues.

* * * * *